United States Patent
Mendiratta et al.

(10) Patent No.: US 9,426,021 B2
(45) Date of Patent: Aug. 23, 2016

(54) COMMUNICATION FAILOVER IN A DISTRIBUTED NETWORK

(71) Applicant: Avaya Inc., Basking Ridge, NJ (US)

(72) Inventors: Harsh V. Mendiratta, East Brunswick, NJ (US); Chandra Ravipati, Thornton, CO (US); Christopher D. Baldwin, Princeton, NJ (US); Rickie E. Meis, Broomfield, CO (US); Mark T. Rolfs, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 245 days.

(21) Appl. No.: 13/926,963

(22) Filed: Jun. 25, 2013

(65) Prior Publication Data

US 2014/0325258 A1 Oct. 30, 2014

Related U.S. Application Data

(60) Provisional application No. 61/817,028, filed on Apr. 29, 2013.

(51) Int. Cl.
*G06F 11/07* (2006.01)
*H04L 12/24* (2006.01)
*G06F 11/20* (2006.01)

(52) U.S. Cl.
CPC ....... *H04L 41/0668* (2013.01); *G06F 11/2002* (2013.01)

(58) Field of Classification Search
CPC ........... G06F 11/2002; G06F 11/2005; G06F 11/2028; G06F 11/2033
USPC ...................................................... 714/4.11
See application file for complete search history.

(56) References Cited

U.S. PATENT DOCUMENTS

| | | | |
|---|---|---|---|
| 7,457,249 B2 | 11/2008 | Baldwin et al. | |
| 7,564,793 B2 | 7/2009 | Baldwin et al. | |
| 7,613,106 B2 | 11/2009 | Baldwin et al. | |
| 7,983,148 B1 | 7/2011 | Abramson et al. | |
| 8,315,165 B2 | 11/2012 | Eydelman et al. | |
| 2004/0037219 A1* | 2/2004 | Shaffer et al. | 370/217 |
| 2006/0146859 A1* | 7/2006 | Baldwin et al. | 370/438 |
| 2007/0058790 A1* | 3/2007 | Wynn | 379/88.17 |
| 2008/0137650 A1* | 6/2008 | Kumarasamy et al. | 370/356 |
| 2010/0198975 A1* | 8/2010 | Willars et al. | 709/227 |
| 2010/0214908 A1* | 8/2010 | Ralev | 370/221 |
| 2010/0248739 A1* | 9/2010 | Westerberg et al. | 455/453 |
| 2012/0252475 A1* | 10/2012 | Farrell et al. | 455/450 |

(Continued)

*Primary Examiner* — Chae Ko
(74) *Attorney, Agent, or Firm* — Sheridan Ross P.C.

(57) ABSTRACT

An initial request is received to establish a communication session. The initial request contains a communication address of a first communication device. A communication server detects that the communication session cannot be established across a primary network. In response, the initial request is repurposed by changing the first communication address to a second communication address. The changed request is sent to a communication system, which adds a field to the changed request that indicates that the changed request is to be sent via a secondary network. The changed request is sent with the field to the communication server. The changed request with the second communication address is sent to a gateway to establish the communication session across a secondary network. A portion of the communication session is established using the second communication address. The first communication address is sent in the portion of the communication session using Dual-Tone-Multi-Frequency (DTMF).

20 Claims, 3 Drawing Sheets

(56) References Cited

U.S. PATENT DOCUMENTS

2013/0155842 A1* 6/2013 Moore et al. ............... 370/221
2013/0163433 A1 6/2013 Baldwin et al.
2013/0326261 A1* 12/2013 Paulson ...................... 714/4.11

* cited by examiner

US 9,426,021 B2

COMMUNICATION FAILOVER IN A DISTRIBUTED NETWORK

RELATED U.S. PATENT APPLICATION DATA

This application claims the benefit under 35 U.S.C. §119(e) of U.S. Provisional Application No. 61/817,028, filed Apr. 29, 2013 entitled "DPT IN THE DISTRIBUTED ARCHITECTURE REM ADDITIONS."

TECHNICAL FIELD

The systems and methods relate to network failover systems and in particular to network failover systems using different protocols.

BACKGROUND

There are a variety of systems that can fail over a communication from a primary network to a secondary network. This works well when there is a single centralized system in the network that manages all aspects of the communication system. When the primary network fails, the centralized system is able to route a communication to the secondary network without any problems.

However, when the network has been decentralized, the problem becomes more acute. In distributed networks such as Session Initiation Protocol (SIP) networks, functionality has been distributed between devices such as proxy servers and other communication systems. For example, a proxy server may handle the initial call processing and another communication system will handle call features, such as call forwarding (e.g., by using a Back-to-Back User Agent (B2B UA)). In these distributed environments, the proxy server and the other communication system need to be included in the process of directing the communication to a secondary network so that the call features can still operate in a failover situation.

SUMMARY

Systems and methods are provided to solve these and other problems and disadvantages of the prior art. An initial request is received from a communication device to establish a communication session. The initial request contains a communication address of a first communication device. A communication server or communication system detects that the communication session cannot be established across a primary network. In response, the initial request is repurposed by changing the first communication address to a second communication address. The changed request is sent to a communication system, which adds a field to the changed request that indicates that the changed request is to be sent via a secondary network. The changed request is sent with the field to the communication server. The changed request with the second communication address is sent to a gateway to establish the communication session across a secondary network. A portion of the communication session is established using the second communication address. The first communication address is sent in the portion of the communication session using Dual-Tone-Multi-Frequency (DTMF). The first communication address is used to complete the communication session from the second communication device to the first communication device.

DETAILED DESCRIPTION

Figure 1:
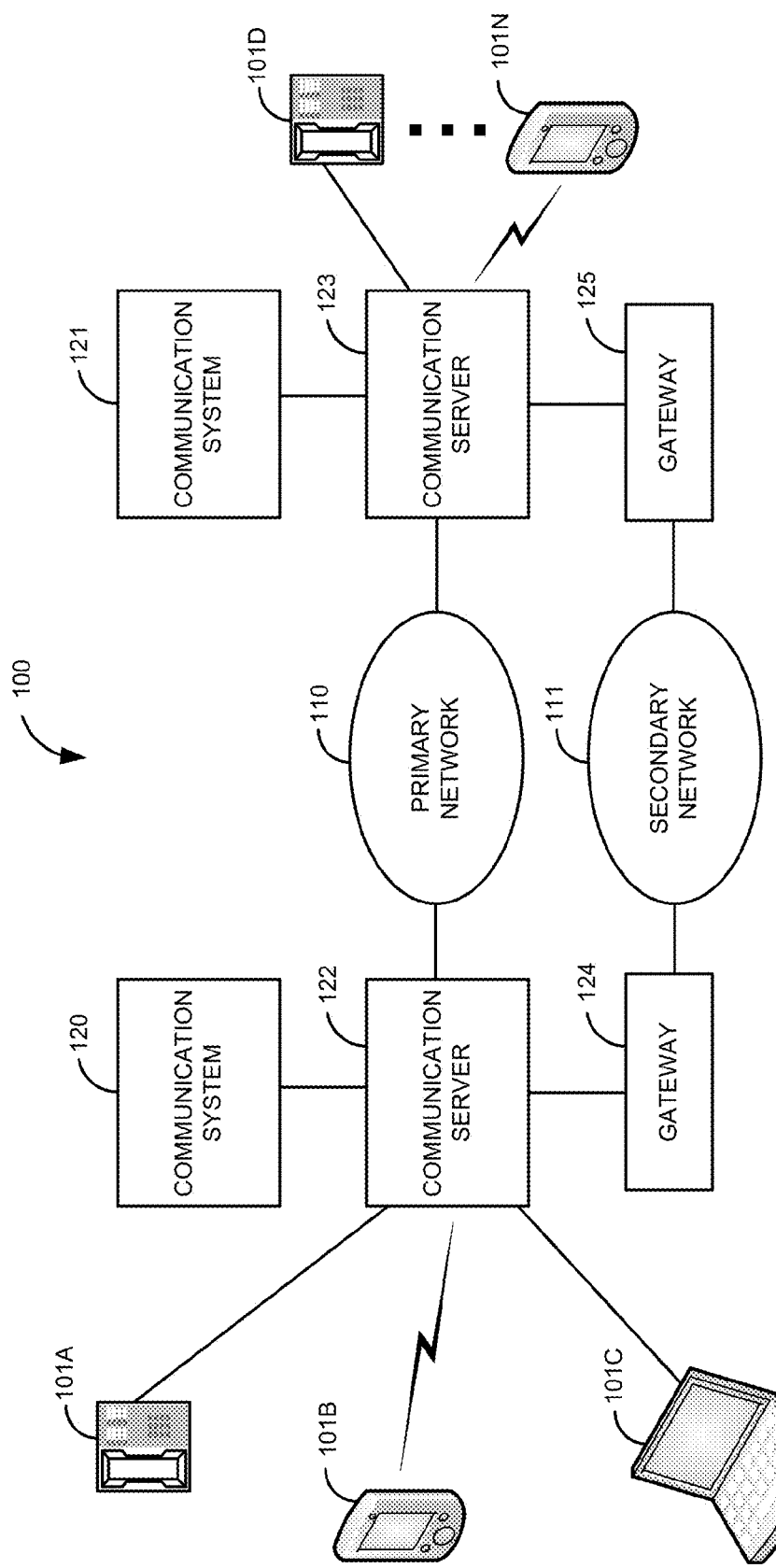
FIG. 1 is a block diagram of a first illustrative system for failing over a communication session in a distributed network.

FIG. 1 is a block diagram of a first illustrative system 100 for failing over a communication session in a distributed network. The first illustrative system 100 comprises communication devices 101A-101N, a primary network 110, a secondary network 111, communication systems 120 and 121, communication servers 122 and 123, and gateways 124 and 125. In FIG. 1, communication devices 101A-101C are shown connecting to communication server 122 for illustrative purposes. Likewise communication devices 101D-101N are shown connecting to communication server 123. However, one of ordinary skill in the art would recognize that the communication devices 101A-101N can be connected via a network that allows the communication devices 101A-101N to connect with any of the communication systems 120-121, the communication servers 122-123, and the gateways 124-125 respectively.

The communication devices 101A-101N may be any device that can communicate on the primary network 110 or the secondary network 111, such as a Personal Computer (PC), a telephone, a video system, a cellular telephone, a Personal Digital Assistant (PDA), a tablet device, a notebook device, a voice server, a video server, a text messaging server, a voice mail system, and the like. As shown in FIG. 1, any number of communication devices 101A-101N may be connected to the networks 110 and 111.

The primary network 110 and/or the secondary network 111 can be any network that can send and receive information, such as the Internet, a Wide Area Network (WAN), a Local Area Network (LAN), the Public Switched Telephone Network (PSTN), a packet switched network, a circuit switched network, a cellular network, an enterprise network, a corporate network, a combination of these, and the like. The primary network 110 can use a variety of protocols, such as Ethernet, Internet Protocol (IP), Session Initiation Protocol (SIP), H.323, Integrated Services Digital Network (ISDN), and the like. In one embodiment, the primary network 110 is a SIP network and the secondary network 111 is a PSTN network that uses Plain Old Telephone System (POTS) or ISDN.

The communication systems 120 and 121 can be any communication system that provides services for communications, such as a communication feature server, a JSR 289 server, and/or the like. For example, the communication systems 120 and 121 can be Avaya's Communication Manager™. The communication systems 120 and 121 can provide a variety of services, such as call forwarding, call recording, call screening, call center services, Interactive Voice Response (IVR) services, call transferring, and/or the like. The communication systems 120 and 121 can be a combined communication system. The communication systems 120 and 121 may use a variety of protocols, such as Session Initiation Protocol (SIP), H.323, Integrated Digital Services Network (ISDN), Asynchronous Transfer Mode (ATM), and/or the like.

The communication servers 122 and 123 can be a registrar, a proxy server, a SIP proxy server, a routing device, and/or the like. For example, the communication servers 122 and 123 can be Avaya's Session Manager™. The communication servers 122 and 123 can use a variety of protocols, such as Session Initiation Protocol (SIP), H.323, Integrated Digital Services Network (ISDN), Asynchronous Transfer Mode (ATM), and/or the like.

The gateways 124 and 125 may be any device that can change one protocol to another protocol, such as a session border controller and the like. For example, the gateways 124 and 125 can converts SIP, ISDN, and/or H.323 to Plain Old Telephone System (POTS) in one direction and POTS to SIP, ISDN, and/or H.323 in the other direction.

In one embodiment, the communication device 101A sends an initial request to establish a communication session with the communication device 101D across the primary network 110. The initial request comprises a communication address of the communication device 101D. For example, the communications address of the communication device 101D may be a telephone number of the communication device 101D. However, in other embodiments, the communication address of the communication device 101D may be another type of address, such as a network address, a device address, and/or the like. The communication session can be any type of communication session, such as a voice session, a text session, a video session, and/or the like.

The communication server 122 receives the initial request. The communication server 122 (and/or the communication system 120) detects that the communication session across the primary network 110 cannot be established. The communication server 122 can detect that communication session cannot be established in various ways, such as, based on a packet time-out, based on receiving or not receiving a message, based on a status, and/or the like. In response to the communication server 122 detecting that the communication session across the primary network 110 cannot be established, the communication server 122 repurposes the initial request by changing the communication address of the communication device 101D to a second communication address.

The changed request is repurposed because the communication session needs to use the second communication address in order to connect to the communication device 101D. In this embodiment, in order to use the secondary network/complete the communication, the communication server 122 needs one or more services that are provided by the communication system that the communication server 122 does not support (e.g. to send the first communication address via Dual-Tone-Multi-Frequency (DTMF), B2B UA services, and/or the like).

The second communication address is an intermediary address that is used to establish a communication session using the secondary network 111. The second communication address can be a Listed Directory Number (LDN) that is a designated telephone number (or address) for failover communications. The second communication address can be, depending on the protocol used, in different fields within a packet or header. The communication server 122 sends the changed request with the second communication address to the communication system 120.

The communication system 120 receives the changed request. The communication system 120 adds a field that contains a parameter that indicates that the request is to be sent via the secondary network 111. The field can be in any type of field, including a header, a payload, a Session Initiation Protocol (SIP) invocation attachment, an identifier, an addition to an existing field, a change of an existing field, and/or the like. The communication system 120 sends the changed request with the field to the communication server 122. In response to receiving the changed request with the field, the communication server 122 recognizes that the request is to be sent via the secondary network 111 (based on the field that indicates that the request is to be sent via the secondary network 111). The communication server 122 sends the changed request (with at least the second communication address) to the gateway 124. The gateway 124 initiates establishment of a portion of the communication session, across the secondary network 111, using the second communication address with the gateway 125, the communication server 123, and/or the communication system 121.

Once the portion of the communication session is established, the communication system 120 sends the communication address of the communication device 101D (that was in the changed request that the communication system 120 received) in the established communication session (i.e., in-band) using Dual-Tone-Multi-Frequency (DTMF) tones. The communication system 121 receives the DTMF tones with the communication address of the communication device 101D. The communication address of the communication device 101D is used to complete establishment of the communication session with the communication device 101D.

To illustrate, consider the following example. A user at communication device 101B makes a voice call to another user at communication device 101N. The user at communication device 101B has invoked a voice recording application (a Back-to-Back User Agent) that is running in communication system 120 to record all calls made to the user at communication device 101N.

The user at communication device 101B calls the user at communication device 101N by dialing 303-538-1111 (the communication address of communication device 101N). An initial SIP INVITE is sent to the communication server 122 (a SIP proxy server) to establish a SIP communication session across the primary network 110. The communication server 122 detects that the communication session across the primary network 110 cannot be established.

In response to detecting that the communication session cannot be established across the primary network 110, the communication server 122 repurposes the initial SIP INVITE by changing the communication address of the communication device 101N (303-538-1111) with a second address (303-538-1000) that is a Listed Directory Number (LDN 303-538-1000) for the location of where the communication device 101N is located. The LDN is a dedicated telephone number for failover conditions. The changed SIP INVITE may be in the following format: SIP: 3035381000@avaya.com;avaya-dpt-dest=303-538-1111 SIP/2.0.

The communication server 122 sends the changed SIP INVITE with the LDN to the communication system 120. The communication system 120 adds a field that indicates that the SIP INVITE is to be sent via the secondary network 111. For example, the SIP INVITE may be in the following format: SIP:3035381000@avaya.com;av-dpt-outgoing SIP/2.0. The "av-dpt-outgoing" portion of the SIP INVITE indicates that the SIP INVITE is to be sent via the secondary network 111. The communication system 120 sends the changed SIP INVITE with the field to the communication server 122. The communication server 122 (this could be a different communication server 122 than received the initial SIP INVITE) sends the changed request to establish a portion of the communication session using the second address to the gateway 124. A communication session is established between the communication system 120 and the communication 121.

The communication system 121 sends a pass code (e.g., five known DTMF digits) back to the communication system 120. The pass code tells the communication system 120 that it has hit the right termination point and is okay to send the first communication address (303-538-1111). In response to receiving the pass code, the communication system 120 sends the communication address of the communication device 101N (303-538-1111) using DTMF tones to the communication system 121. In response to receiving the communication address of the communication device 101N, the communication system 121 completes the establishment of the communication session with the communication device 101N. The two parties at communication devices 101B and 101N can now communicate with each other. The two parties are unaware of the failure of the primary network 110.

In another embodiment, when the communication system 120 receives the changed request (e.g., the SIP: 3035381000@avaya.com;avaya-dpt-dest=303-538-1111 SIP/2.0 message), instead of adding the field, the communication system 120 sends the request directly to the gateway 124. In this embodiment, the "avaya-dpt-dest" field is the field that contains the parameter that indicates that the changed request is to be sent via the secondary network 111. When the communication system 120 sees the "avaya-dpt-dest" field, the communication system 120 knows to send the request to the gateway 124. The above examples use a specific tag for the field that indicates that the request is to be sent via the secondary network 111. However, in other embodiments, various types of different fields and/or tags may be used.

In another embodiment, where the secondary network 111 supports a protocol such as SIP, the communication system 120 can send the request directly to the secondary network 111, thus bypassing the gateway 124.

In one embodiment, the communication address of the communication device 101N cannot be directly dialed from the secondary network 111 (e.g., the number is an unlisted extension). In this case, the above process overcomes the issue of not being able to directly dial the communication device 101N by sending the communication address of the communication device 101N using DTMF so that the communication session between communication devices 101B and 101N can be established seamlessly.

In another embodiment, the second address (e.g. the LDN) is a number that can be used as a regular number or as a number that supports the above described process. In order to distinguish between a failover communication and a regular communication, once the portion of the communication session has been established, the communication system 120 sends an identifier in the portion of the communication session using DTMF. The identifier is used by the communication system 121 to distinguish between a failover communication and a regular communication. If communication system 121 does not receive the identifier, the communication system 121 assumes that the communication session is a regular communication session. If the communication system 121 receives the identifier, the communication system 121 assumes that the communication session is a failover communication session.

In another embodiment, the identifier can be used to distinguish between different types of arriving communications. For example, instead of distinguishing between a failover communication session, the identifier can distinguish between different types of failover communications. For example, a voice, video, text communication, a specific set of users, an encrypted communication, and/or the like.

Figure 2:
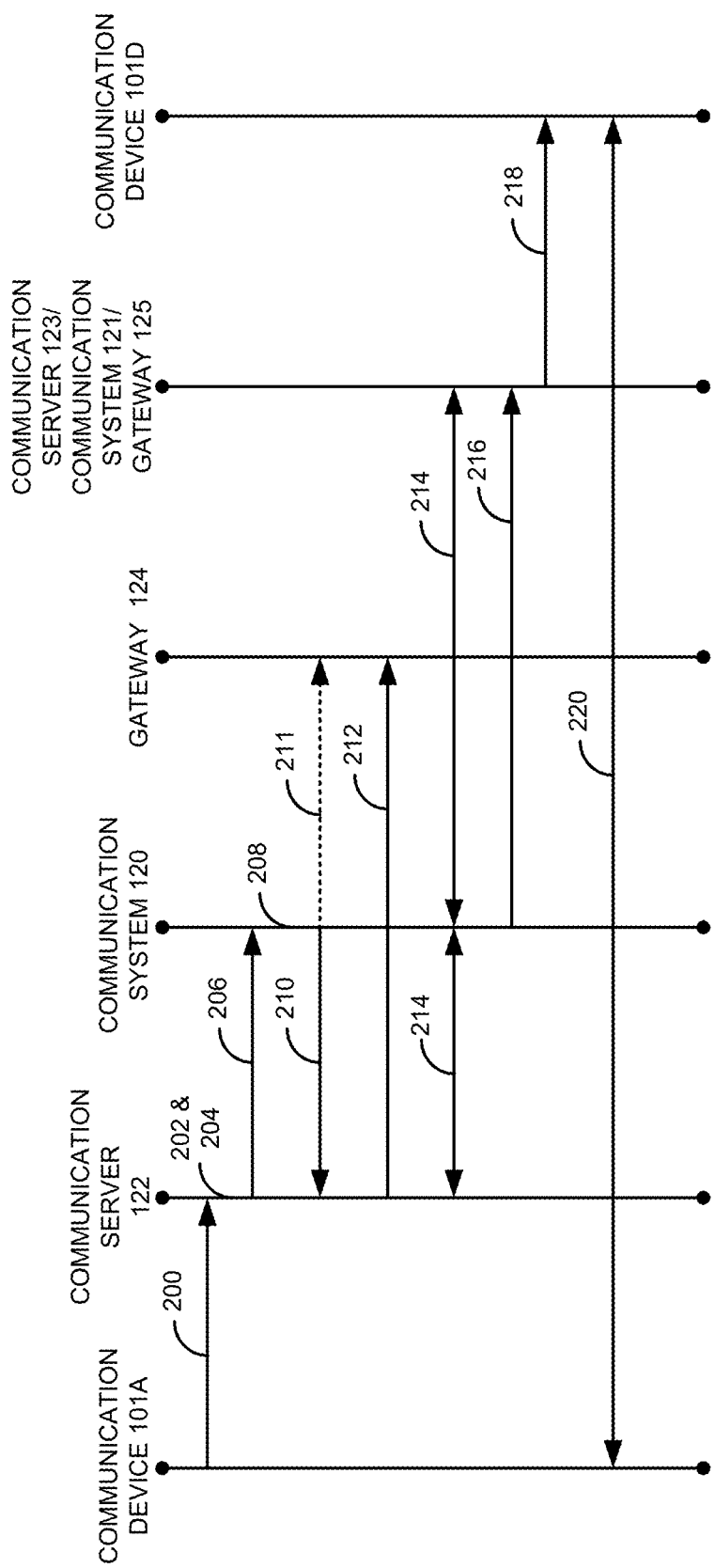
FIG. 2 is a flow diagram of a method for failing over a communication session in a distributed network.
Figure 3:
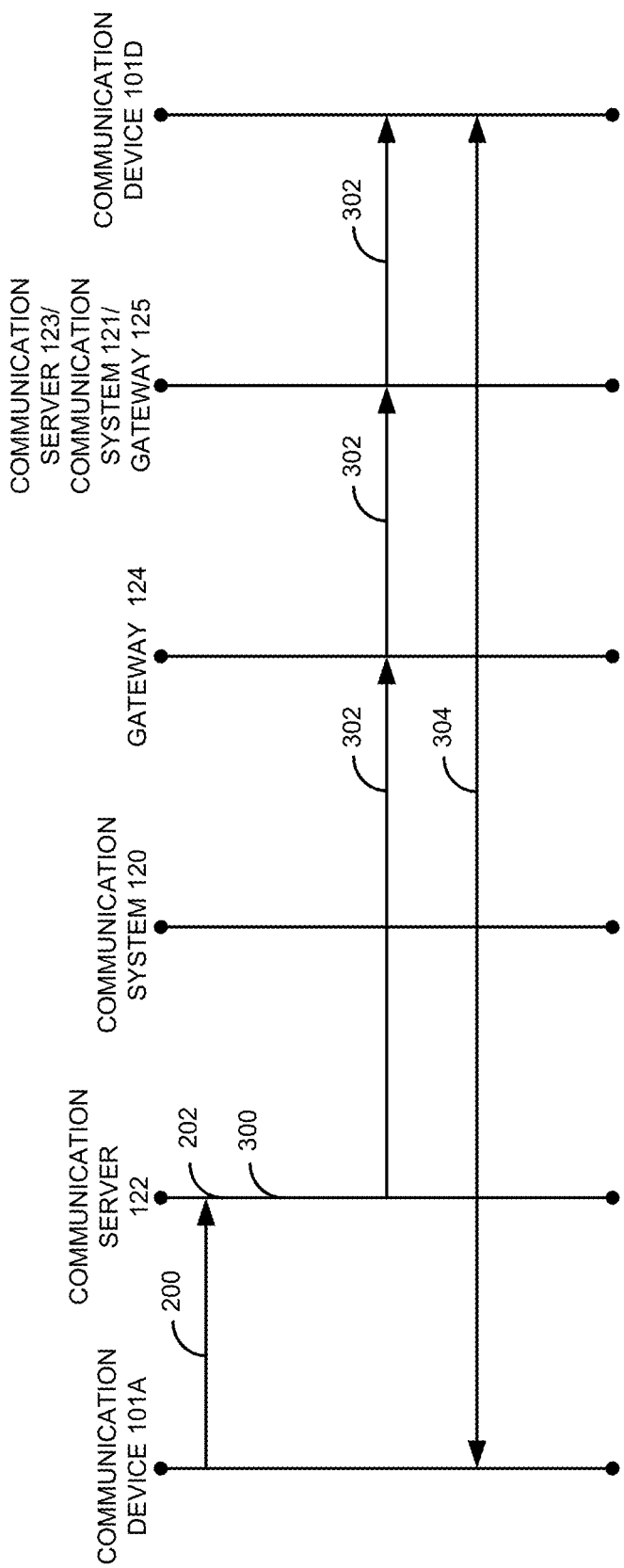
FIG. 3 is a flow diagram of a method for failing over a communication session in a distributed network.

FIG. 2 is a flow diagram of a method for failing over a communication session in a distributed network. Illustratively, the communication devices 101A-101N, the communication systems 121 and 122, the communication servers 122 and 123, and the gateways 124 and 125 are stored-program-controlled entities, such as a computer or processor, which performs the method of FIGS. 2-3 and the processes described herein by executing program instructions stored in a tangible computer readable storage medium, such as a memory or disk. Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts by the communication device 101A sending 200 an initial request to establish a communication session with the communication device 101D across the primary network 110 (i.e., the default is to route the initial request over the primary network 110). The initial request comprises the communication address of the communication device 101D (e.g., in a SIP TO: field). The communication server 122 detects 202 that the communication session across the primary network 110 cannot be established. In response to detecting that the communication session across the primary network 110 cannot be established, the communication server 122 repurposes 204 the initial request by changing the communication address of the communication device 101D with a second communication address.

The communication server 122 sends 206 the changed request to communication system 120. The communication system 120 adds 208 a field (e.g. changes a field) to the changed request that indicates that the changed request is to be sent via the secondary network 111. The communication system 120 sends 210 the changed request with the field to the communication server 122. The communication server 122 sends 212 the changed request (with at least the second communication address) to the gateway 124. The gateway 124 (e.g. in combination with communication servers 122-123, communications systems 120-121, and/or gateway 125) establishes 214 a portion of the communication session across the secondary network 111. The communication system 120 sends 216 the communication address of the communication device 101D using DTMF in the portion of the communication session. Communication system 121 completes establishment 218 of the communication session with the communication device 101D using the communication address of communication device 101D. The communication session between the communication devices 101A and 101D is now complete as shown in step 220.

In another embodiment, the communication 121 will establish the communication session by sending a request to establish the communication with communication device 101D by sending a request message to the communication server 123 to establish the communication session between communication devices 101A and 101B.

In an alternative embodiment, instead of the communication system 120 sending the changed request with the field in step 210 and the communication server 122 sending the changed request with the field to the gateway in step 212, the communication system 120 can send 211 the changed request (with at least the second communication address) directly to the gateway 124. In this embodiment, the changed request that is sent in step 206 contains the field that indicates that the changed request is to be sent via the secondary network 111 (e.g., the avaya-dpt-dest field described above).

FIG. 3 is a flow diagram of a method for failing over a communication session in a distributed network. The process starts by the communication device 101A sending 200 an initial request to establish a communication session with the communication device 101D across the primary network 110. The initial request comprises the communication address of the communication device 101D. The communication server 122 detects 202 that the communication session across the primary network 110 cannot be established. In response to detecting that the communication session across the primary network 110 cannot be established, the communication server 122 determines 300 that the remote communication system (e.g., the communication server 123, the communication system 121, and the gateway 125) related to the communication address of the communication device 101D does not support the sending of the communication address of the communication device 101D in the portion of the communication session using DTMF. The communication server 122 can determine that the remote communication system related to the communication address of the communication device 101D does not support the sending of the communication address of the communication device 101D in the portion of the communication session using DTMF in various ways, such as, based on an administration, based on not receiving a pass code or other indicator from the remote communication system (after following steps 200-214), and/or the like.

In response to determining that the remote communication system related to the address of the communication device 101A does not support the sending of the first communication address in the portion of the communication session using DTMF, the communication server 122 directly calls 302 the remote communication system on the secondary network 111 using the network address of communication device 101D (assuming that the communication address of the communication device 101D can be called directly via the secondary network 111). A communication session is then established 304 between the communication device 101A and the communication device 101D.

In the above embodiments, the process only describes a single communication session between communication two communication devices 101. However, in other embodiments, a communication session may involve multiple communication devices. For example, a conference call can be setup between communication devices 101A-101N using the above processes. In addition, one of skill in the art would recognize that the processes described above can be implemented using any number of protocols, such as SIP, ISDN, H.322, POTS, and/or the like.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
  receiving an initial request, at a communication server, from a second communication device, to establish a communication session with a first communication device across a primary network, wherein the initial request comprises a first communication address of the first communication device;
  detecting, in the communication server or a communication system, that the communication session across the primary network cannot be established;
  in response to detecting that the communication session across the primary network cannot be established, modifying, by the communication system or the communication server, a field to the changed request to contain a parameter that indicates that the changed request is to be sent via a secondary network, wherein the first communication address in the initial request is transformed to a second communication address in the changed request; and
  sending, by the communication server, the changed request with at least the second communication address to a gateway to establish the communication session across the secondary network, wherein the gateway establishes a portion of the communication session using the second communication address and sends the first communication address in the portion of the communication session using Dual-Tone-Multi-Frequency (DTMF).

2. The method of claim 1, further comprising:
  sending the changed request with the field to the communication server; and
  completing establishment of the communication session with the second communication device using the first communication address.

3. The method of claim 1, further comprising:
  sending an identifier in the portion of the communication session using DTMF, wherein the identifier is used to distinguish between a failover communication and a regular communication.

4. The method of claim 1, further comprising:
  receiving a pass code; and
  in response to receiving the pass code, sending the first communication address in the portion of the communication session using in-band signaling.

5. The method of claim 1, wherein the second communication address is a designated address for failover communications.

6. The method of claim 1, wherein the initial request to establish the communication session across the primary network is a Session Initiation Protocol (SIP) request and wherein the secondary network is a Public Switched Telephone Network.

7. The method of claim 1, further comprising:
  determining that a remote communication system related to the communication address of the first communication device does not support the sending of the first communication address in the portion of the communication session using DTMF; and
  in response to determining that the remote communication system related to the communication address of the first communication device does not support the sending of the first communication address in the portion of the communication session using DTMF, directly calling the remote communication system on the secondary network using the first network address.

8. The method of claim 1, wherein the first communication address cannot be directly dialed from the secondary network.

9. The method of claim 1, wherein the primary network is an Integrated Digital Services Network (ISDN) or an H.323 network.

10. The method of claim 1, wherein the initial request is a Session Initiation Protocol (SIP) INVITE and wherein the second address is in a SIP invocation attachment.

11. A system comprising:
a communication server that:
receives an initial request, from a second communication device, to establish a communication session with a first communication device across a primary network, wherein the initial request comprises a first communication address of the first communication device;
detects that the communication session across the primary network cannot be established;
causes the initial request to be transformed into a changed request, in the changed request the first communication address in the initial request is transformed to a second communication address in response to detecting that the communication session across the primary network cannot be established,
wherein the changed request contains a parameter that indicates that the changed request is to be sent via the secondary network; and
sends the changed request with at least the second communication address to a gateway to establish the communication session across a secondary network, wherein the gateway sends the first communication address in a portion of the communication session using Dual-Tone-Multi-Frequency (DTMF) and completes establishment of the communication session using the second communication address.

12. The system of claim 11, wherein the communication system completes establishment of the communication session with the second communication device using the first communication address.

13. The system of claim 11, wherein the communication system sends an identifier in the portion of the communication session using DTMF, wherein the identifier is used to distinguish between a failover communication and a regular communication.

14. The system of claim 11, wherein the communication system receives a pass code and in response to receiving the pass code, send the first communication address in the portion of the communication session using in-band signaling.

15. The system of claim 11, wherein the second communication address is a designated address for failover communications.

16. The system of claim 11, wherein the initial request to establish the communication session across the primary network is a Session Initiation Protocol (SIP) request and wherein the secondary network is a Public Switched Telephone Network.

17. The system of claim 11, wherein the communication system determines that a remote communication system related to the communication address of the first communication device does not support the sending of the first communication address in the portion of the communication session using DTMF and directly calls the remote communication system on the secondary network using the first network address in response to determining that the remote communication system related to the communication address of the first communication device does not support the sending of the first communication address in the portion of the communication session using DTMF.

18. The system of claim 11, wherein the primary network is an Integrated Digital Services Network (ISDN) or an H.323 network and wherein the first communication address cannot be directly dialed from the secondary network.

19. A gateway, comprising:
a processor that:
receives an initial request, from a second communication device, to establish a communication session with a first communication device across a primary network, wherein the initial request comprises a first communication address of the first communication device;
transmits the initial request to a communication server;
in response to a determination that the communication session across the primary network cannot be established, receives a changed request derived from the initial request, wherein the first communication address in the initial request is transformed to a second communication address in the changed request and wherein the changed request contains a parameter that indicates that the changed request is to be sent via the secondary network;
establishes a portion of the communication session;
sends the first communication address in the portion of the communication session using Dual-Tone-Multi-Frequency (DTMF) signaling; and
completes establishment of the communication session using the second communication address.

20. The gateway of claim 19, wherein the parameter in the changed request is an identifier, wherein the identifier distinguishes between a failover communication and a regular communication, wherein the gateway receives a pass code and, in response to receiving the pass code, sends the first communication address in the portion of the communication session using DTMF signaling, wherein the second communication address is a designated address for failover communications, wherein the initial request to establish the communication session across the primary network is a Session Initiation Protocol (SIP) request, and wherein the secondary network is a Public Switched Telephone Network.

* * * * *